US010528897B2

(12) United States Patent
Labat et al.

(10) Patent No.: US 10,528,897 B2
(45) Date of Patent: Jan. 7, 2020

(54) GRAPH DATABASES FOR STORING MULTIDIMENSIONAL MODELS OF SOFTWARE OFFERINGS

(75) Inventors: Jerome Labat, San Carlos, CA (US); Ramkumar Venkataraman, Foster City, CA (US); John Eugene Edward, Fremont, CA (US); Ramachandran Varadharajan, Femont, CA (US)

(73) Assignee: INTUIT INC., Mountain View, CA (US)

(*) Notice: Subject to any disclaimer, the term of this patent is extended or adjusted under 35 U.S.C. 154(b) by 967 days.

(21) Appl. No.: 13/096,866

(22) Filed: Apr. 28, 2011

(65) Prior Publication Data

US 2012/0278365 A1 Nov. 1, 2012

(51) Int. Cl.
*G06F 16/00* (2019.01)
*G06Q 10/06* (2012.01)
*G06F 16/901* (2019.01)

(52) U.S. Cl.
CPC .......... *G06Q 10/06* (2013.01); *G06F 16/9024* (2019.01)

(58) Field of Classification Search
CPC ........... G06F 17/3089; G06F 17/30294; G06F 17/30377; G06F 16/9024; G06F 16/9027; G06Q 10/06; Y04S 10/54
USPC ................................................. 707/798, 802
See application file for complete search history.

(56) References Cited

U.S. PATENT DOCUMENTS

| | | | |
|---|---|---|---|
| 6,338,149 B1* | 1/2002 | Ciccone et al. | 714/38.12 |
| 8,179,809 B1* | 5/2012 | Eppstein | G06F 9/5061 370/252 |
| 8,583,707 B2* | 11/2013 | Matsumura | G06F 17/30569 707/606 |
| 2003/0120780 A1 | 6/2003 | Zhu | |
| 2004/0088365 A1 | 5/2004 | Gadbois | |
| 2005/0177600 A1 | 8/2005 | Eilam | |
| 2005/0216503 A1* | 9/2005 | Charlot | G06Q 50/22 |
| 2008/0052719 A1* | 2/2008 | Briscoe et al. | 718/104 |
| 2008/0216069 A1 | 9/2008 | Leymann | |
| 2010/0110933 A1* | 5/2010 | Wilcock | G06Q 10/10 370/255 |
| 2012/0096043 A1* | 4/2012 | Stevens, Jr. | G06F 17/30958 707/798 |

FOREIGN PATENT DOCUMENTS

WO 0007099 A1 2/2000

OTHER PUBLICATIONS

Angles, Renzo et al., "Survey of Graph Database Models", ACM Computing Surveys, vol. 40, No. 1, Article 1, publication date: Feb. 2008.
Examination Report issued to Application No. GB1317436.2 dated Mar. 14, 2019.
Great Britian Examination Report issued in GB1317436.2 dated Oct. 8, 2018.

* cited by examiner

*Primary Examiner* — Vincent F Boccio
(74) *Attorney, Agent, or Firm* — Patterson + Sheridan, LLP

(57) ABSTRACT

The disclosed embodiments provide a system that facilitates the maintenance and execution of a software offering. During operation, the system obtains model data associated with a multidimensional model of the software offering. Next, the system stores the model data in a graph database. Finally, the system uses the graph database to facilitate management of the software offering.

20 Claims, 5 Drawing Sheets

GRAPH DATABASES FOR STORING MULTIDIMENSIONAL MODELS OF SOFTWARE OFFERINGS

RELATED APPLICATION

The subject matter of this application is related to the subject matter in a co-pending non-provisional application by inventors Jerome Labat, Ramachandran Varadharajan, Wilson Lau, and Thomas Bishop, entitled "Multidimensional Modeling of Software Offerings," having Ser. No. 13/031,950, and filing date 22 Feb. 2011.

The subject matter of this application is also related to the subject matter in a co-pending non-provisional application by inventors Jerome Labat, Ramachandran Varadharajan, Wilson Lau, and Thomas Bishop, entitled "Automatic Provisioning of Resources to Software Offerings," having Ser. No. 13/031,968, and filing date 22 Feb. 2011.

The subject matter of this application is also related to the subject matter in a co-pending non-provisional application by inventors Jerome Labat, Ramkumar Venkataraman, Eugene Edward, and Ramachandran Varadharajan, entitled "Dependency Visualization and Fault Diagnosis Using Multidimensional Models for Software Offerings," having Ser. No. 13/091,992, and filing date 21 Apr. 2011.

BACKGROUND

Related Art

The present embodiments relate to techniques for managing software offerings. More specifically, the present embodiments relate to graph databases for storing multidimensional models of software offerings.

Recent computing trends have shifted the processing and consumption of data and services to cloud computing systems. Such cloud computing systems allow software providers to deploy, execute, and manage software offerings on shared infrastructure resources such as servers, network equipment, platform-virtualization software, and/or datacenter space. Furthermore, such resources may be dynamically provisioned and/or scaled, thus enabling consumption of the resources as services.

For example, a cloud computing provider may provide virtualized storage, network, and/or computing resources to multiple cloud computing customers. The cloud computing customers may deploy software offerings on the virtualized resources and pay the cloud computing provider only for resources consumed by the software offerings. As a result, the cloud computing customers may avoid capital expenditures associated with purchasing, setting up, and/or managing the underlying hardware and software. Furthermore, the centralization and sharing of infrastructure resources may improve the resources' utilization rates and management overhead.

Hence, the deployment, execution, and management of software offerings may be facilitated by mechanisms for dynamically allocating, configuring, and monitoring infrastructure resources used by the software offerings.

SUMMARY

The disclosed embodiments provide a system that facilitates the maintenance and execution of a software offering. During operation, the system obtains model data associated with a multidimensional model of the software offering. Next, the system stores the model data in a graph database. Finally, the system uses the graph database to facilitate management of the software offering.

In some embodiments, the system also obtains an update to the multidimensional model and modifies the stored model data in the graph database based on the update.

In some embodiments, storing the model data in the graph database involves creating a set of nodes representing a set of service components and a set of resources used by the software offering, and connecting the nodes using a set of relationships representing dependencies among the service components and the resources.

In some embodiments, storing the model data in the graph database further involves creating a set of attributes associated with the nodes.

In some embodiments, each of the attributes comprises an attribute value and an attribute type.

In some embodiments, each of the relationships comprises a relationship name.

In some embodiments, using the graph database to facilitate management of the software offering involves at least one of:
  (i) enabling retrieval of the model data from the graph database;
  (ii) facilitating impact analysis of the software offering; and
  (iii) facilitating display of the model data within a graphical user interface (GUI).

BRIEF DESCRIPTION OF THE FIGURES

In the figures, like reference numerals refer to the same figure elements.

DETAILED DESCRIPTION

Figure 1:
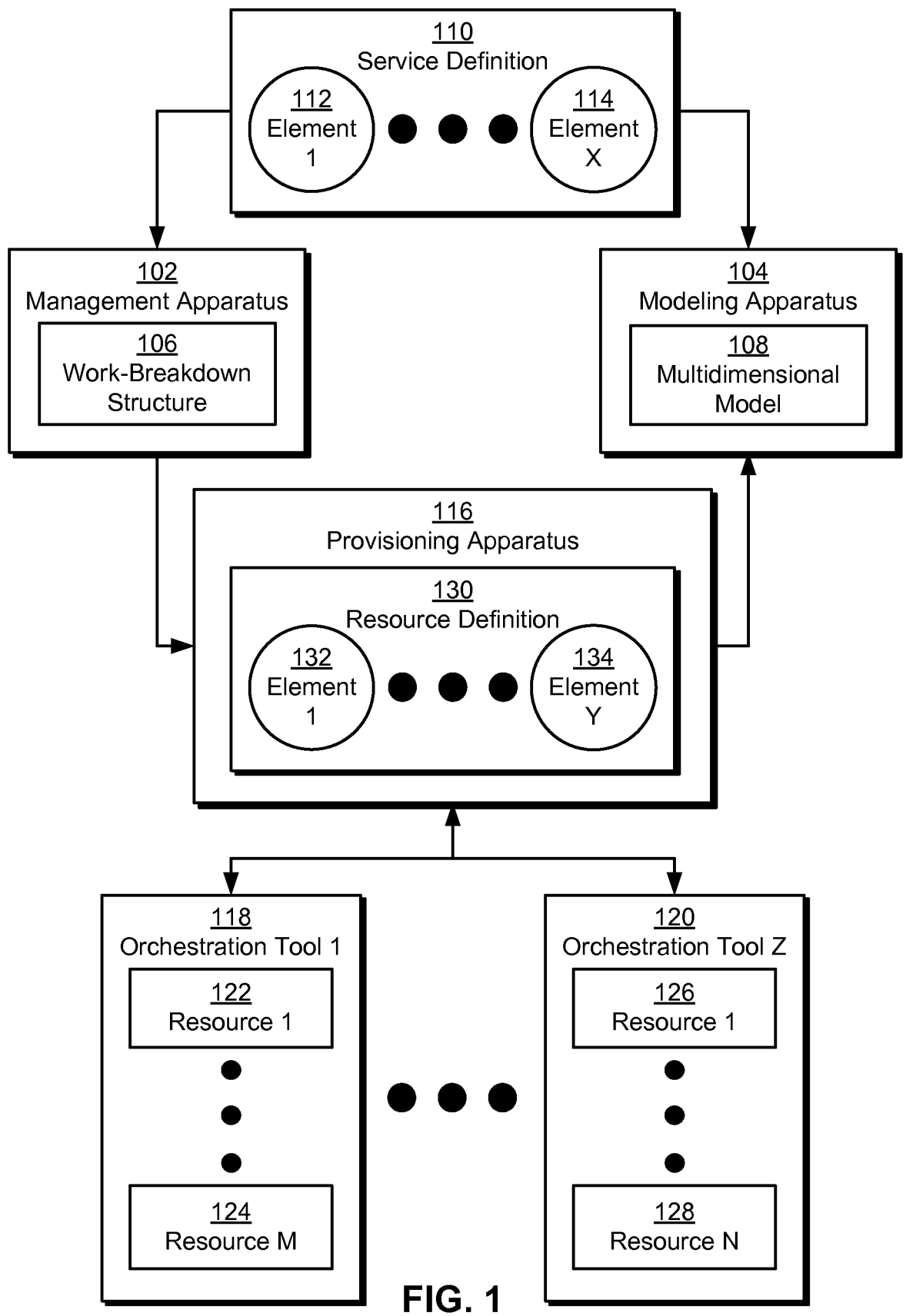
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the maintenance and execution of a software offering. The software offering may correspond to an application that is deployed on one or more servers and accessed over a network connection. For example, the software offering may provide a web application, distributed application, and/or web service to users of the software offering.

More specifically, the disclosed embodiments provide a graph database for storing model data associated with a multidimensional model of the software offering. The multidimensional model may include a set of service components in the software offering, a set of resources used by the software offering, and a set of dependencies among the service components and/or resources. The multidimensional model may thus facilitate the deployment, execution, and maintenance of the software offering.

To store the model data, the graph database may include a set of nodes representing a set of service components and a set of resources used by the software offering, and a set of relationships representing dependencies among the service components and the resources. Each node may be associated with a set of attributes. For example, a node representing a resource used by the software offering may include an attribute identifying the type of resource represented by the node (e.g., "VirtualHost," "PhysicalHost," etc.) and/or a name of the resource represented by the node. Similarly, each relationship may connect two nodes and include a relationship name specifying the type of dependency that exists between the service components and/or resources represented by the nodes. For example, a relationship from a node representing a physical server to a node representing a virtual server farm may have a relationship name of "part of" to describe the inclusion of the physical server in the virtual server farm.

The graph database may additionally be used to facilitate management of the software offering. First, the graph-based model data may be retrieved from the graph database faster than from relational databases and/or other data-management mechanisms. For example, the model data may be stored in a single graph within the graph database and obtained through a traversal of the graph. On the other hand, a relational database may store the model data in multiple tables and references and, in turn, require the use of complex queries to retrieve the model data.

Efficient retrieval of model data from the graph database may additionally facilitate impact analysis of the software offering by enabling the identification of service components and/or resources potentially affected by a fault, outage, and/or maintenance. Along the same lines, the graph database's improved response times to queries may facilitate display of the model data within a graphical user interface (GUI). For example, efficient retrieval of model data from the graph database may allow a user to transition smoothly from one view of the model data to another within the GUI.

FIG. 1 shows a schematic of a system in accordance with an embodiment. As shown in FIG. 1, the system includes a management apparatus 102, a modeling apparatus 104, and a provisioning apparatus 116. Each of these components is discussed in further detail below.

In one or more embodiments, the system of FIG. 1 is used to manage the deployment and execution of a software offering on a set of resources (e.g., resource 1 122, resource m 124, resource 1 126, resource n 128). The software offering may correspond to a software program that performs tasks for a set of users. For example, the software offering may allow the users to collaborate on projects, file income taxes, manage personal or small business finances, and/or perform data mining on a target data set.

Furthermore, the software offering may be implemented using a client-server architecture. Components of the software offering may be deployed and executed on one or more servers (e.g., in a data center) and accessed from other machines using a locally installed executable, a command-line interface, and/or a web browser and network connection. In other words, the software offering may be implemented using a cloud computing system that is accessed over the Internet.

To enable execution of the software offering, users associated with the creation, deployment, and/or execution of the software offering may determine a set of requirements associated with the software offering. The users may then allocate resources (e.g., resource 1 122, resource m 124, resource 1 126, resource n 128) in the cloud computing system to components in the software offering and configure the allocated resources in a way that allows the executing software offering to meet the requirements. For example, a development team for the software offering may provide a policy specifying a level of availability, reliability, scalability, security, and/or response time in the software offering. Administrators for the cloud computing system may ensure compliance with the policy by allocating sufficient infrastructure resources to the software offering and/or configuring the resources to provide requisite levels of redundancy, security, and/or load balancing in the software offering.

Those skilled in the art will appreciate that the cloud computing system may use virtualization to deploy and execute the software offering on a set of shared resources. In particular, a number of orchestration tools (e.g., orchestration tool 1 118, orchestration tool z 120) may be used to virtualize and/or provision different types of resources in the cloud computing system. For example, a virtual machine monitor may allocate and/or manage computing resources by creating and executing virtual machines as abstractions of physical servers. Similarly, a virtual filer may combine storage resources from a variety of storage devices into a resource pool and allocate logical volumes of storage from the resource pool. Finally, network routers and/or switches may partition network resources into virtual local area networks (VLANs) that connect physical and/or virtual computing and/or storage resources in the cloud computing system.

Moreover, each orchestration tool may include functionality to dynamically re-provision resources in response to changes in the software offering and/or in demand for the resources. For example, a virtual machine monitor may instantiate a new virtual machine to enable the addition of a new web server to the software offering. The virtual machine monitor may also allocate a set of physical computing resources (e.g., processor, memory, etc.) to the virtual machine to enable execution of the web server on the resources. Finally, the virtual machine monitor may move the virtual machine to a different set of physical resources if the web server's resource requirements change and/or the physical resources (e.g., servers) used to execute the web server become overloaded.

In other words, the use of resources by the software offering may be managed by a number of disparate, independently acting orchestration tools. As a result, the cloud computing system may lack a comprehensive view of dependencies between software components in the software offering and the hardware resources used to execute the software components. For example, the cloud computing system may lose track of resources allocated to the software offering once the orchestration tools begin reallocating and/or re-provisioning the resources.

Such lack of dependency information may cause problems with tracking and managing events and/or failures in the cloud computing system. For example, a server outage in the cloud computing system may require manual intervention by administrators to determine the set of hardware and software components affected by the outage and/or perform corrective actions that enable recovery from the server outage.

In one or more embodiments, the system of FIG. 1 reduces complexity associated with managing requirements and dependencies in the software offering by creating a multidimensional model 108 of the software offering and using multidimensional model 108 to manage the deployment and execution of the software offering. As shown in FIG. 1, multidimensional model 108 may be created from a service definition 110 of the software offering and a resource definition 130 of resources available for use by the software offering.

Service definition 110 may be obtained from a user (e.g., developer, architect, etc.) associated with the creation and/or development of the software offering. More specifically, service definition 110 may correspond to a logical representation of the software offering in terms of the software offering's configuration, topology, policies, and/or QoS attributes. As a result, elements (e.g., element 1 112, element x 114) of service definition 110 may include one or more tiers, a set of service components, and/or a set of connections. For example, an architect of the software offering may provide service definition 110 by inputting the number of tiers, level of security, software-development-lifecycle stage, and/or software stack associated with the software offering into a user interface provided by management apparatus 102.

On the other hand, resource definition 130 may be obtained from administrators and/or orchestration tools of the cloud computing system and correspond to a logical representation and/or division of available infrastructure resources in the cloud computing system in terms of the resources' locations, states, and/or utilization. Elements (e.g., element 1 132, element y 134) of resource definition 130 may thus represent physical and/or virtual resources, resource clusters, security zones, hosting segments, and/or locations in the cloud computing system. For example, an administrator may manually populate resource definition 130 with an inventory of physical and/or virtual resources in the cloud computing system, or provisioning apparatus 116 may receive notifications of changes to resources (e.g., addition of new resources, removal of existing resources) in the cloud computing system from the orchestration tools (e.g., virtual machine monitors, virtual filers) and update resource definition 130 accordingly.

To create multidimensional model 108, modeling apparatus 104 may map a first set of elements (e.g., element 1 112, element x 114) from service definition 110 to a second set of elements (e.g., element 1 132, element y 134) from resource definition 130. The mappings may represent dependencies of the first set of elements on the second set of elements. For example, a mapping from a service component in service definition 110 to a resource in resource definition 130 may indicate the allocation of the resource to the service component by an orchestration tool. Creation of multidimensional models for software offerings is discussed in a co-pending non-provisional application by inventors Jerome Labat, Ramachandran Varadharajan, Wilson Lau, and Thomas Bishop, entitled "Multidimensional Modeling of Software Offerings," having Ser. No. 13/031,950, and filing date 22 Feb. 2011, which is incorporated herein by reference.

In one or more embodiments, the creation of multidimensional model 108 involves the identification of a set of requirements associated with the software offering from service definition 110, as well as the subsequent allocation of a subset of the resources from resource definition 130 to service components in service definition 110 based on the requirements. In particular, management apparatus 102 may determine the software offering's requirements from a set of policies in service definition 110 and store the requirements in a work-breakdown structure 106. The policies may include a software-development-lifecycle policy, a security policy, a software-template policy, a QoS policy, and/or a structural policy. The requirements may thus specify the amount and/or configuration of resources required to satisfy the policies.

Next, provisioning apparatus 116 may use work-breakdown structure 106 to automatically provision a set of resources for use by the software offering without requiring manual configuration of the resources by a user (e.g., administrator). For example, provisioning apparatus 116 may use work-breakdown structure 106 to create a set of service containers for hosting the software offering. Provisioning apparatus 116 may then allocate resources to the service containers by requesting the required amounts and/or configurations of resources from the corresponding orchestration tools. Automatic provisioning of resources to software offerings is discussed in a co-pending non-provisional application by inventors Jerome Labat, Ramachandran Varadharajan, Wilson Lau, and Thomas Bishop, entitled "Automatic Provisioning of Resources to Software Offerings," having Ser. No. 13/031,968, and filing date 22 Feb. 2011, which is incorporated herein by reference.

As mentioned previously, multidimensional model 108 may include dependencies between service components in service definition 110 and resources in resource definition 130. Consequently, modeling apparatus 104 may create multidimensional model 108 by mapping resources allocated by provisioning apparatus 116 to the service components to which the resources were allocated.

Modeling apparatus 104 may also update the mappings based on changes to the provisioned resources. For example, resources provisioned to service components may change as the orchestration tools allocate new resources, deallocate currently allocated resources, and/or use different sets of physical resources to execute virtualized resources (e.g., virtual machines, logical volumes, VLANs, etc.). Such changes may be obtained by provisioning apparatus 116 through querying and/or monitoring of the orchestration tools. The changes may also be used by provisioning apparatus 116 to update resource definition 130. The updates may then be propagated to multidimensional model 108 via modeling apparatus 104.

Because multidimensional model 108 contains an up-to-date representation of service components, resources, and dependencies in the software offering, the system of FIG. 1 may facilitate management of the software offering within the cloud computing system. For example, multidimensional model 108 may facilitate the automatic deployment of the software offering on the allocated resources, identification of resources allocated to the software offering, identification of failures during execution of the software offering, and/or management of changes associated with the software offering or the resources. In other words, the creation and update of multidimensional model 108 may reduce complexity and/or overhead associated with configuration management, fault diagnosis and remediation, deployment, and/or resource provisioning in the software offering.

As described in the above-referenced applications, multidimensional model 108 may correspond to a graph that contains a set of nodes and a set of mappings between pairs of nodes. Consequently, model data associated with multidimensional model 108 may be difficult and/or inefficient to store and retrieve using conventional data-storage mechanisms such as relational databases. For example, persistence of multidimensional model 108 in a relational database may require the use of a large number of database tables and/or complex queries, resulting in response times that increase linearly with the amount of model data stored in the relational database.

To reduce the overhead and/or complexity associated with storing multidimensional model 108, modeling apparatus 104 may include functionality to store the model data in a graph database. The graph database may contain a set of nodes representing a set of service components and a set of resources used by the software offering, as well as a set of relationships representing dependencies among the service components and the resources. In other words, the graph database may provide a more efficient and/or intuitive representation of a graph-based multidimensional model 108 than a tuple-based relational database. For example, the graph database may store the model data within a single graph and retrieve the model data by traversing the graph, thus providing query results in constant time instead of linear time.

The graph database may additionally facilitate management of the software offering. First, the faster response times associated with the graph database may facilitate retrieval of the model data by management apparatus 102, provisioning apparatus 116, and/or another component of the system. Moreover, efficient retrieval of the model data from the graph database may allow the model data to be displayed within a graphical user interface (GUI) in real-time. The graph database may also facilitate impact analysis of the software offering by enabling the identification of service components and/or resources potentially affected by maintenance, outages, and/or faults. Consequently, the disclosed embodiments may increase use of multidimensional model 108 in managing the software offering across the software development lifecycle of the software offering. Use of graph databases to store multidimensional models is discussed in further detail below with respect to FIG. 2.

Figure 2:
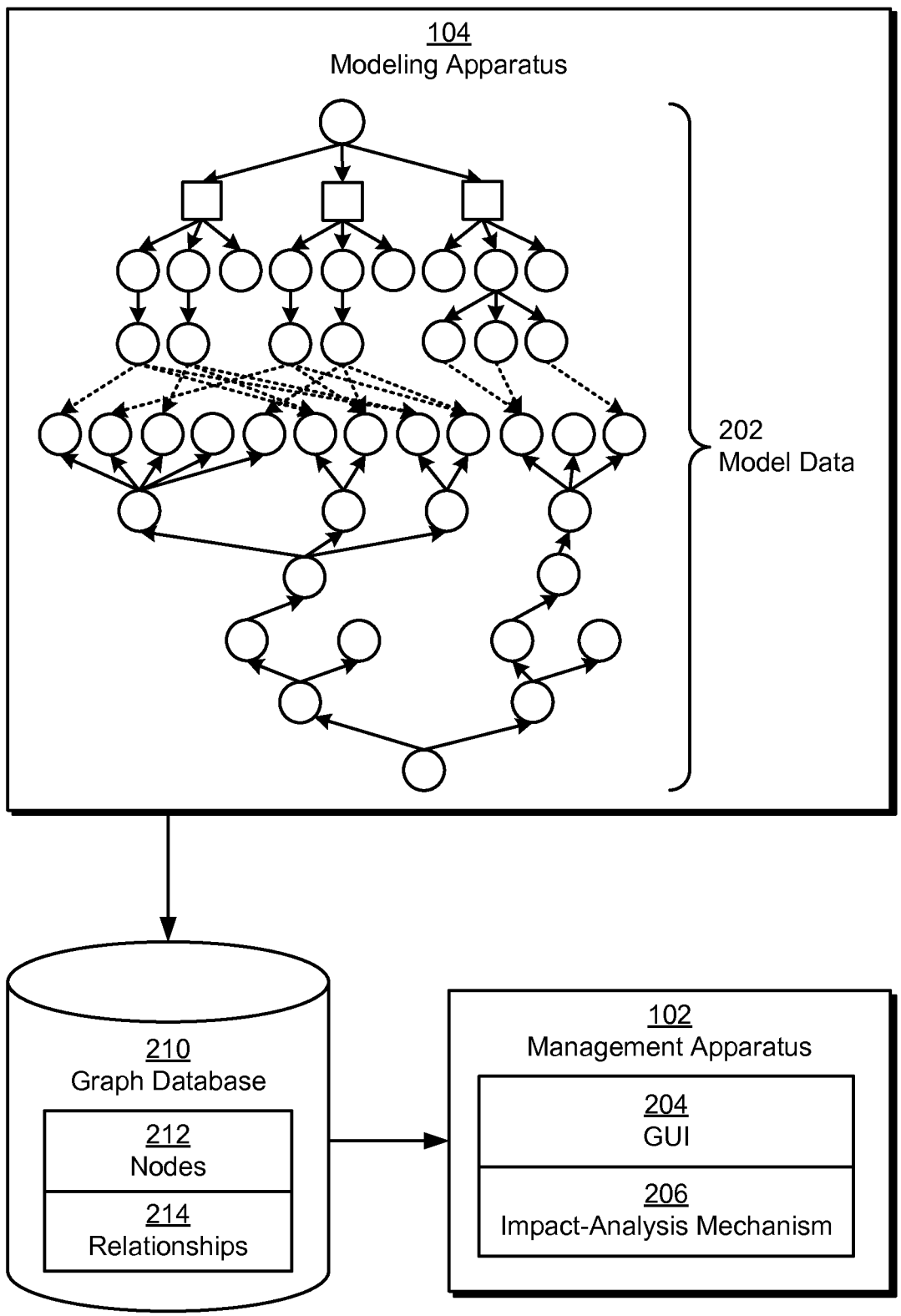
FIG. 2 shows the use of a graph database in storing a multidimensional model of a software offering in accordance with an embodiment.

FIG. 2 shows the use of a graph database 210 in storing a multidimensional model (e.g., multidimensional model 108 of FIG. 1) of a software offering in accordance with an embodiment. First, model data 202 associated with the multidimensional model may be obtained by modeling apparatus 104. For example, model data 202 may be obtained from a relational database and/or other data-management mechanism for the multidimensional model. Model data 202 may also be obtained from orchestration tools (e.g., orchestration tool 1 118, orchestration tool z 120) associated with the software offering as resources are allocated to, deallocated from, and/or configured for use by the software offering.

Next, modeling apparatus 104 may store model data 202 in graph database 210 by creating a set of nodes 212 representing a set of service components and a set of resources used by the software offering. For example, modeling apparatus 104 may create nodes 212 corresponding to web servers, application servers, databases, servers, virtual machines, storage volumes, virtual filers, virtual networks, network interface cards (NICs), and/or network addresses. Modeling apparatus 104 may also connect nodes 212 using a set of relationships 214 representing dependencies among the service components and the resources. For example, modeling apparatus 104 may specify relationships 214 associated with the inclusion of a resource in a larger resource and/or resource pool, the hosting of a service component on a resource, and/or the use of a resource by a service component and/or other resource. Because nodes 212 and relationships 214 may correspond to built-in constructs of graph database 210, modeling apparatus 104 may store model data 202 in graph database 210 in a more efficient and/or intuitive fashion than in a relational database and/or other data-management mechanism.

Modeling apparatus 104 may additionally create a set of attributes associated with nodes 212. Each attribute may provide information related to the node to which the attribute is related. In addition, the attribute may include an attribute value and an attribute type. For example, an attribute for a node representing a database may specify the vendor of the database using an attribute value of "Oracle" and an attribute type of "vendor."

Similarly, each of the relationships 214 may connect a pair of nodes 212 and include a relationship name describing the type of dependency that exists between the service components and/or resources represented by the pair of nodes 212. For example, a relationship from a node representing a physical host to a node representing a web server may have a relationship name of "hosts" to indicate the hosting of the web server by the physical host. Nodes 212 and relationships 214 are discussed in further detail below with respect to FIG. 3.

In addition, updates to the multidimensional model may be used to create, delete, and/or modify nodes 212 and relationships 214 so that graph database 210 contains an up-to-date representation of dependencies in the software offering. In particular, a provisioning apparatus (e.g., provisioning apparatus 116 of FIG. 1) may obtain updates to model data 202 from one or more of the orchestration tools. Modeling apparatus 104 may then update graph database 210 based on the updated model data 202. Alternatively, modeling apparatus 104 may first update a representation of the multidimensional model in a relational database and/or other data-management mechanism and subsequently propagate the update from the data-management mechanism to graph database 210.

After graph database 210 is created, management apparatus 102 may use graph database 210 to facilitate management of the software offering. First, graph database 210 may facilitate retrieval of model data 202 by providing faster response times to queries for model data 202 than relational databases and/or other data-management mechanisms. For example, graph database 210 may process a query for model data 202 in constant time, while a relational database may process a query for the same data in linear time.

Furthermore, graph database 210 may enable the real-time display of model data 202 within a graphical user interface (GUI) 204. For example, efficient retrieval of model data 202 from graph database 210 may allow management apparatus 102 to transition smoothly between different real-time views of the multidimensional model in GUI 204. Display of model data 202 within GUI 204 is discussed in a co-pending non-provisional application by inventors Jerome Labat, Ramkumar Venkataraman, Eugene Edward, and Ramachandran Varadharajan, entitled "Dependency Visualization and Fault Diagnosis Using Multidimensional Models for Software Offerings," having Ser. No. 13/091,992, and filing date 21 Apr. 2011, which is incorporated herein by reference.

The increased efficiency of graph database 210 may additionally facilitate fault management and/or maintenance planning in the software offering. More specifically, an impact-analysis mechanism 206 provided by management apparatus 102 and/or another component of the system may use graph database 210 to identify service components and/or resources potentially impacted by faults, maintenance, and/or outages associated with the software offering. For example, impact-analysis mechanism 206 may query graph database 210 for the set of nodes connected, directly or indirectly, to a node associated with a fault in the corresponding service component and/or resource. Impact-analysis mechanism 206 may then use the query results to identify a set of service components and/or resources potentially impacted by the fault and/or diagnose the root cause of the fault.

Figure 3:
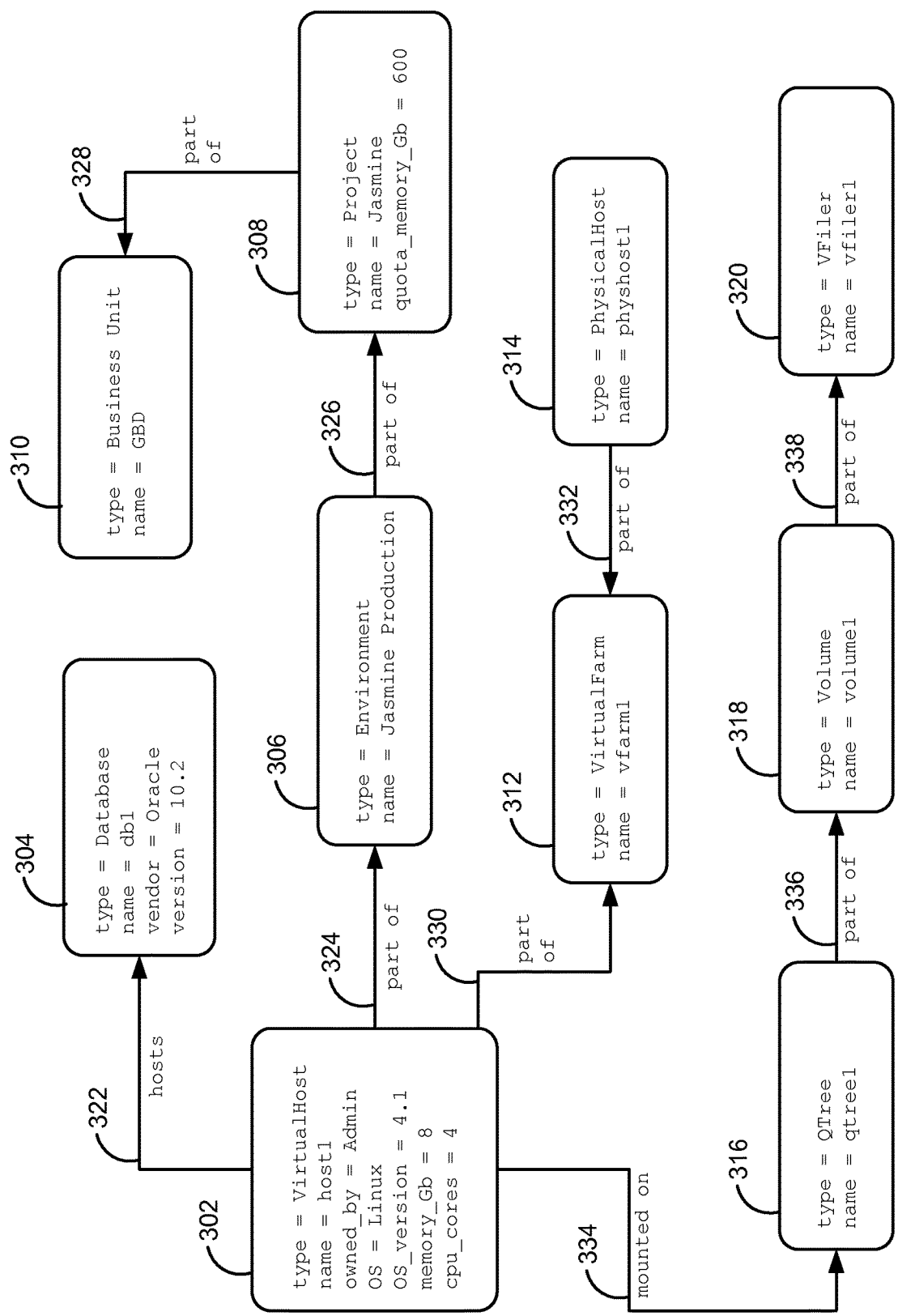
FIG. 3 shows an exemplary set of model data from a graph database in accordance with an embodiment.

FIG. 3 shows an exemplary set of model data from a graph database (e.g., graph database 210 of FIG. 2) in accordance with an embodiment. As shown in FIG. 3, the model data includes a set of nodes 302-320 and a set of relationships 322-338. Each node 302-320 includes a set of attributes; each attribute includes an attribute type and an attribute value. Similarly, each relationship 322-338 includes a relationship name.

As discussed above, the model data may represent dependencies among service components and resources in a software offering. The attributes of each node 302-320 may thus describe the service component and/or resource represented by the node, while the relationship name of each relationship 322-338 may provide information regarding the type of dependency represented by the relationship.

More specifically, node 302 includes seven attributes specifying the attribute types of "type," "name," "owned_by," "OS," "OS_version," "memory_Gb," and "cpu_cores," along with the attribute values of "Virtual-Host," "host1," "Admin," "Linux," "4.1," "8," and "4," respectively. In other words, node 302 may represent a virtual host named "host1" that is owned by an entity named "Admin," runs Linux 4.1 (Linux™ is a registered trademark of Linus Torvalds), and has eight Gigabytes of memory and four central processing unit (CPU) cores.

Node 302 is connected to node 304 via relationship 322. Node 304 includes four attributes: an attribute type of "type" assigned to an attribute value of "Database," an attribute type of "name" assigned to an attribute value of "db1," an attribute type of "vendor" assigned to an attribute value of "Oracle," and an attribute type of "version" assigned to an attribute value of "10.2." Relationship 322 shows a relationship name of "hosts." As a result, nodes 302-304 and relationship 322 may indicate the hosting of a database named "db1" and running Oracle 10.2 (Oracle™ is a registered trademark of Oracle International Corp.) by the virtual host named "host1."

Node 302 is also connected to node 306 via relationship 324. Node 306 includes two attributes, the first with an attribute type of "type" assigned to an attribute value of "Environment," and the second with an attribute type of "name" and an attribute value of "Jasmine Production." Relationship 324 specifies a relationship name of "part of." The virtual host represented by node 302 may thus be a part of an execution environment named "Jasmine Production."

Furthermore, node 306 is connected to node 308 by relationship 326, and node 308 is connected to node 310 by relationship 328. As with relationship 324, relationships 326-328 both have the relationship name of "part of." Node 308 includes three attributes with the following attribute types and values: a "type" of "Project," a "name" of "Jasmine," and a "quota_memory_Gb" of "600." Node 310 has two attributes describing a "type" of "Business Unit" and a "name" of "GBD." Nodes 308-310 and relationships 326-328 may represent the inclusion of the "Jasmine Production" environment in a "Jasmine" development project with a memory quota of 600 Gigabytes, as well as the management of the "Jasmine" project by a business unit named "GBD." Consequently, nodes 306-310 and relationships 324-328 may specify information related to the development and/or ownership of the software offering.

Continuing with the model data of FIG. 3, node 302 may be connected to node 312 by relationship 330. Relationship 330 includes a relationship name of "part of," and node 312 includes two attributes with attribute types of "type" and "name" and attribute values of "VirtualFarm" and "vfarm1," respectively. Along the same lines, node 314 is also connected to node 312 via relationship 332. Relationship 332 also has a relationship name of "part of," and node 314 includes two attributes specifying a "type" of "Physical-Host" and a "name" of "physhost1." Nodes 312-314 and relationships 330-332 may thus indicate the inclusion of both the virtual host named "host1" and the physical host named "physhost1" in the virtual farm named "vfarm1."

Finally, node 302 is connected to node 316 by relationship 334. Node 316 has two attributes with attribute types of "type" and "name" and attribute values of "Qtree" and "qtree1," respectively. Relationship 334 includes a relationship name of "mounted on," indicating that the virtual host represented by node 302 is mounted on a sub-volume represented by node 316 and named "qtree1."

Node 316 is then connected to node 318 by relationship 336, and node 318 is connected to node 320 by relationship 338. Relationships 336-338 both have the same relationship name of "part of," and nodes 318-320 both have two attributes with attribute types of "type" and "name." Node 318 has an attribute value of "Volume" for "type" and an attribute value of "volume1" for "name," while node 320 has an attribute value of "VFiler" for "type" and an attribute value of "vfiler1" for "name." Nodes 318-320 and relationships 336-338 may thus represent the inclusion of the "qtree1" sub-volume in a storage volume named "volume1," as well as the subsequent inclusion of the storage volume in a virtual filer called "vfiler1."

As mentioned previously, nodes 302-320 and relationships 322-338 may be created as built-in constructs of the graph database. For example, the graph database may provide methods, user-interface elements, and/or commands for creating nodes 302-320 and relationships 322-338 and/or for setting attributes and relationship names within nodes 302-320 and relationships 322-338. The graph database may also provide mechanisms for efficiently retrieving the model data. For example, the graph database may enable breadth-first and/or depth-first traversal of nodes 302-320 and relationships 322-338, as well as a search of nodes 302-320 and/or relationships 322-338 with attributes and/or relationship names that match certain keywords and/or parameters.

As a result, the storing of nodes 302-320 and relationships 322-338 in the graph database may facilitate the management of the software offering. First, efficient retrieval of model data associated with nodes 302-320 and relationships 322-338 may allow the graph database to process queries more quickly than a relational database and/or other data-management mechanism. As discussed above, such a reduction in response time may facilitate the display of the model data within a GUI, such as GUI 204 of FIG. 2.

Next, traversal of nodes 302-320 and relationships 322-338 may facilitate impact analysis of the software offering by enabling the identification of service components and/or resources that are potentially affected by faults, outages, and/or maintenance in the software offering. For example, the scheduling of maintenance in the physical host represented by node 314 may result in a traversal from node 314 to node 312, then from node 312 to node 302, thus identifying the virtual farm represented by node 312 and the virtual host represented by node 302 as resources that are potentially impacted by the maintenance. Traversal of nodes 302-320 and relationships 322-338 may also be used in fault diagnosis in the software offering. For example, a partial outage associated with node 302 may be traced to another partial outage associated with node 312, which is then traced to a full outage associated with node 314, thus identifying the physical host represented by node 314 as the root cause of the outages.

Figure 4:
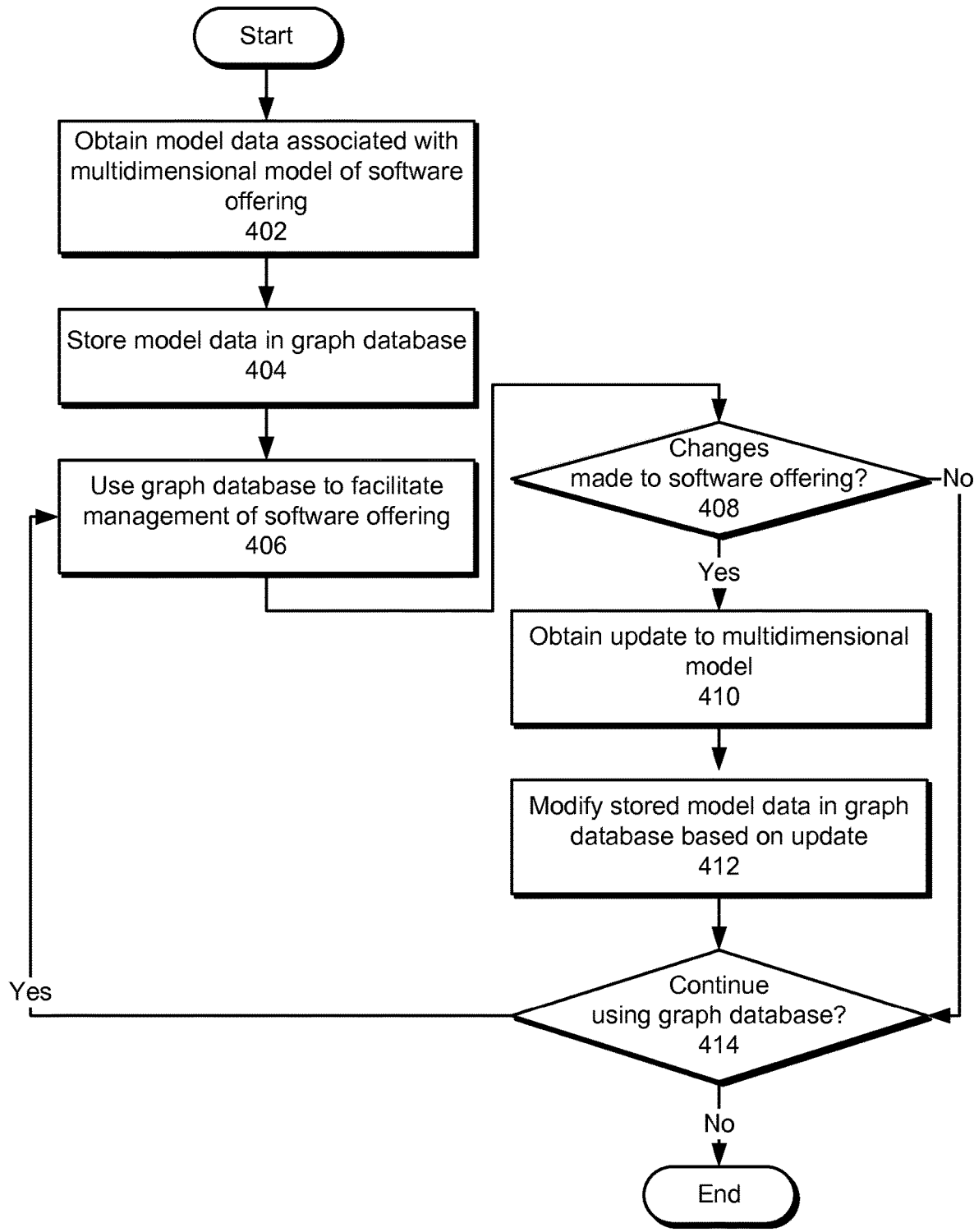
FIG. 4 shows a flowchart illustrating the process of facilitating the maintenance and execution of a software offering in accordance with an embodiment.

FIG. 4 shows a flowchart illustrating the process of facilitating the maintenance and execution of a software offering in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

Initially, model data associated with a multidimensional model of the software offering is obtained (operation 402). For example, the model data may be obtained from a data-management mechanism such as a relational database, a user (e.g., developer, administrator, etc.) associated with the software offering, and/or a set of orchestration tools for the software offering. Next, the model is stored in a graph database (operation 404). To store the model data in the graph database, a set of nodes representing a set of service components and a set of resources used by the software offering may be created, and a set of relationships representing dependencies among the service components and the resources may be used to connect the nodes. A set of attributes associated with the nodes may additionally be created to provide information associated with the service components and/or resources. Along the same lines, each of the relationships may be associated with a relationship name that specifies the type of dependency represented by the relationship.

The graph database is then used to facilitate management of the software offering (operation 406). For example, the graph database may enable efficient retrieval of the model data, which in turn may facilitate impact analysis of the software offering and/or display of the model data within a graphical user interface (GUI).

Changes may also be made to the software offering during use of the graph database (operation 408). For example, service containers in the software offering may change in number, size, and/or location in response to changes in the software offering's policies and/or the availability of the resources. If changes have been made to the software offering, an update to the multidimensional model is obtained (operation 410), and the stored model data in the graph database is modified based on the update (operation 412). If changes have not been made to the software offering, the stored model data is not modified.

The graph database may continue to be used (operation 414). For example, the graph database may continue to facilitate management of the software offering throughout the software development lifecycle of the software offering. If the graph database is to be used, the graph database is used to facilitate management of the software offering (operation 406), and changes to the software offering (operation 408) are reflected in the graph database (operations 410-412). The graph database may thus enable the efficient management of the software offering using an up-to-date representation of service components, resources, and dependencies in the software offering.

Figure 5:
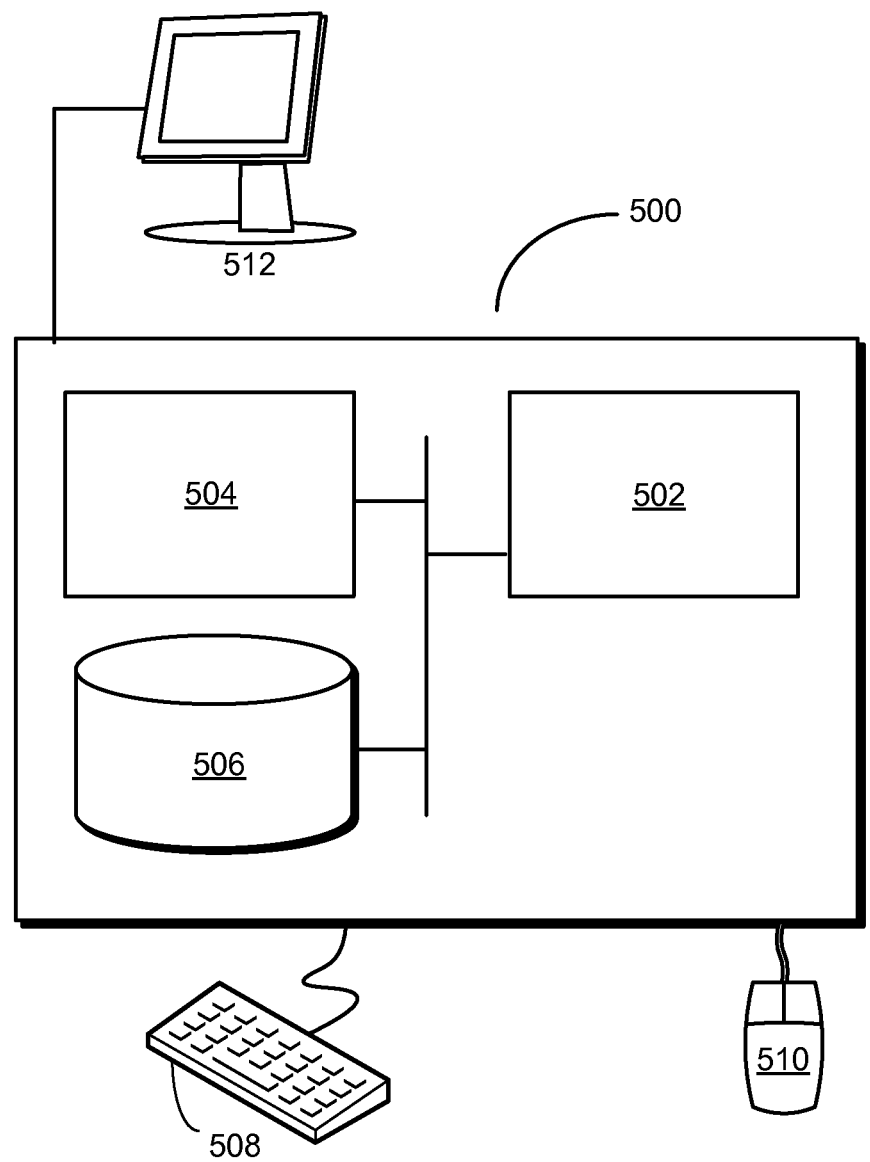
FIG. 5 shows a computer system in accordance with an embodiment.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the maintenance and execution of a software offering. The system may include a modeling apparatus that obtains model data associated with a multidimensional model of the software offering and stores the model data in a graph database. The system may also include a management apparatus that uses the graph database to facilitate management of the software offering.

In addition, one or more components of computer system 500 may be remotely located and connected to the other components over a network. Portions of the present embodiments (e.g., modeling apparatus, management apparatus, etc.) may also be located on different nodes of a distributed system that implements the embodiments. For example, the present embodiments may be implemented using a cloud computing system that manages the deployment, execution, and maintenance of a software offering.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating maintenance and execution of a software offering, comprising:
   obtaining model data associated with a multidimensional model of the software offering;
   storing the model data in a graph database by:
      storing, within each node in a set of nodes of the graph database, a set of attributes for the node, wherein the set of nodes represents service components and resources used by the software offering, and wherein, for a given node in the set of nodes, the set of attributes for the given node specifies operating system or processor information for a respective service component or a respective resource represented by the given node; and
      connecting at least two nodes in the set of nodes, wherein the connecting comprises storing, within the graph database, relationship information that identifies a name of a type of dependency between the service components and the resources represented by the at least two nodes, wherein the set of nodes, each set of attributes, and the relationship information are stored in a single graph within the graph database, and wherein the set of nodes, each set of attributes, and the relationship information are accessible by traversing the single graph; and
   using the graph database to facilitate management of the software offering by:
      traversing the single graph of the graph database to identify the set of nodes, each set of attributes, and the relationship information;
      automatically deploying one or more service components using one or more resources based on the traversing;
      determining a fault in the software offering; and
      automatically identifying a service component related to the fault based on the relationship information.

2. The computer-implemented method of claim 1, wherein storing the model data in the graph database involves: creating the set of nodes.

3. The computer-implemented method of claim 2, wherein storing the model data in the graph database further involves: creating the set of attributes.

4. The computer-implemented method of claim 3, wherein each attribute of the set of attributes comprises an attribute value and an attribute type.

5. The computer-implemented method of claim 1, wherein using the graph database to facilitate management of the software offering further comprises:
   facilitating display of information related to the fault within a graphical user interface (GUI).

6. The computer-implemented method of claim 1,
   wherein the graph database comprises a hierarchy for the set of nodes, wherein the software offering executes in a cloud computing system that comprises the service components and the resources, and
   wherein the method further comprises:
      diagnosing at least one of a fault in the cloud computing system and an outage in the cloud computing system, wherein the diagnosing comprises determining one or more affected resources from the resources by traversing the graph database from a lower node in the hierarchy which represents a resource that is affected by a condition for the software offering to one or more higher nodes in the hierarchy that correspond to the one or more affected,
      resource, wherein the one or more affected resources are affected by the condition, and wherein the condition comprises the at least one of the fault and the outage; and
      indicating the one or more affected resources in a view of at least some of the model data in the graph database at a graphical user interface for the management of the software offering.

7. The computer-implemented method of claim 1, wherein the type of dependency is used to identify groupings for the set of nodes.

8. The computer-implemented method of claim 1, wherein the set of attributes for the given node specifies at least one of a name of an operating system and a version of the operating system.

9. The computer-implemented method of claim 1, wherein the set of attributes for the given node specifies a number of processors available at the given node.

10. The computer-implemented method of claim 1, wherein the set of attributes for the given node specifies an amount of memory that is available at given node.

11. The computer-implemented method of claim 1, further comprising:
   receiving an update for the multidimensional model in a relational database for the multidimensional model that is separate from the graph database; and
   propagating the update from the relational database to the graph database.

12. The computer-implemented method of claim 1, wherein using the graph database to facilitate management of the software offering comprises:
   analyzing the relationship information and at least some of the sets of attributes for the set of nodes of the graph database to generate a first view of the model data;
   presenting the first view at a graphical user interface for the management of the software offering by displaying the graphical user interface at a display coupled to the computer; and
   responsive to a request to update the first view:
      analyzing the relationship information and at least a subset of the sets of attributes for the set of nodes of the graph database to generate a second view of the model data that is different from the first view; and
      updating the graphical user interface by replacing the first view with the second view.

13. The computer-implemented method of claim 12, wherein the computer presents the first view and the second view in real-time, and wherein using the graph database facilitates transitioning between the first view and the second view.

14. The computer-implemented method of claim 12, further comprising:
   receiving an update for the multidimensional model in a relational database for the multidimensional model that is separate from the graph database; and
   propagating the update from the relational database to the graph database,
   wherein using the graph database to facilitate management of the software offering comprises retrieving a first set of the model data and a second set of the model data from the graph database, wherein the first view of the model data comprises the first set of the model data, and wherein the second view of the model data comprises the second set of the model data, and wherein retrieving the first set of the model data and the second set of the model data from the graph database improves response time for the graphical user interface by facilitating the computer replacing the first view with the second view faster than the computer replacing the first view with the second view by retrieving the first set of the model data and the second set of the model data from the relational database without using the graph database.

15. A system for facilitating maintenance and execution of a software offering, comprising:

one or more processors; and memory storing instructions which, when executed by the one or more processors, cause the one or more processors to perform a method for facilitating maintenance and execution of a software offering, the methods comprising:

obtaining model data associated with a multidimensional model of the software offering; and storing the model data in a graph database, wherein, while storing the model data in the graph database, the method further comprises:

storing, within each node in a set of nodes of the graph database, a set of attributes for the node, wherein the set of nodes represents service components and resources used by the software offering, and wherein, for a given node in the set of nodes, the set of attributes for the given node specifies operating system or processor information for a respective service component or a respective resource represented by the given node; and connecting at least two nodes in the set of nodes by storing, within the graph database, relationship information that identifies a name of a type of dependency between the service components and the resources represented by the at least two nodes, wherein the set of nodes, each set of attributes, and the relationship information are stored in a single graph within the graph database, and wherein the set of nodes, each set of attributes, and the relationship information are accessible by traversing the single graph; and using the graph database to facilitate management of the software offering by:

traversing the single graph of the graph database to identify the set of nodes, each set of attributes, and the relationship information;

automatically deploying one or more service components using one or more resources based on the traversing;

determining a fault in the software offering; and automatically identifying a service component related to the fault based on the relationship information.

16. The system of claim 15, wherein using the graph database to facilitate management of the software offering further comprises:

facilitating display of information related to the fault within a graphical user interface (GUI).

17. A non-transitory computer-readable storage medium storing instructions that when executed by a computer cause the computer to perform a method for facilitating maintenance and execution of a software offering, the method comprising:

obtaining model data associated with a multidimensional model of the software offering;

storing the model data in a graph database by:

storing, within each node in a set of nodes of the graph database, a set of attributes for the node, wherein the set of nodes represents service components and resources used by the software offering, and wherein, for a given node in the set of nodes, the set of attributes for the given node specifies operating system or processor information for a respective service component or a respective resource represented by the given node; and connecting at least two nodes in the set of nodes, wherein the connecting comprises storing, within the graph database, relationship information that identifies a name of a type of dependency between the service components and the resources represented by the at least two nodes, wherein the set of nodes, each set of attributes, and the relationship information are stored in a single graph within the graph database, and wherein the set of nodes, each set of attributes, and the relationship information are accessible by traversing the single graph; and using the graph database to facilitate management of the software offering by:

traversing the single graph of the graph database to identify the set of nodes, each set of attributes, and the relationship information;

automatically deploying one or more service components using one or more resources based on the traversing;

determining a fault in the software offering; and automatically identifying a service component related to the fault based on the relationship information.

18. The non-transitory computer-readable storage medium of claim 17, wherein storing the model data in the graph database involves:

creating the set of nodes; and connecting the set of nodes using a set of relationships representing dependencies among the service components and the resources.

19. The non-transitory computer-readable storage medium of claim 18, wherein storing the model data in the graph database further involves: creating the set of attributes.

20. The non-transitory computer-readable storage medium of claim 17, wherein using the graph database to facilitate management of the software offering involves at least one of:

enabling retrieval of the model data from the graph database;

facilitating impact analysis of the software offering; and facilitating display of the model data within a graphical user interface (GUI).

* * * * *